(12) United States Patent
Komolrochanaporn

(10) Patent No.: US 9,086,179 B1
(45) Date of Patent: Jul. 21, 2015

(54) QUICK COUPLING PIPE FITTING SYSTEM

(76) Inventor: Naris Komolrochanaporn, Bangkok (TH)

( * ) Notice: Subject to any disclaimer, the term of this patent is extended or adjusted under 35 U.S.C. 154(b) by 5 days.

(21) Appl. No.: 13/134,805

(22) Filed: Jun. 16, 2011

(51) Int. Cl.
*F16L 17/00* (2006.01)
*F16L 37/091* (2006.01)

(52) U.S. Cl.
CPC .................. *F16L 37/091* (2013.01)

(58) Field of Classification Search
CPC .................................. F16L 37/091
USPC ................................. 285/39, 340
See application file for complete search history.

(56) References Cited

U.S. PATENT DOCUMENTS

| | | | | |
|---|---|---|---|---|
| 5,292,157 A | * | 3/1994 | Rubichon | 285/39 |
| 5,328,215 A | * | 7/1994 | Grenier | 285/318 |
| 5,695,224 A | * | 12/1997 | Grenier | 285/104 |
| 7,530,606 B1 | * | 5/2009 | Yang | 285/340 |
| 7,644,955 B1 | | 1/2010 | Komolrochanaporn | |

* cited by examiner

*Primary Examiner* — Aaron Dunwoody
(74) *Attorney, Agent, or Firm* — Sandy Lipkin

(57) ABSTRACT

A quick coupling pipe fitting system is disclosed that connects two ends of two different pipes together in a fluid tight manner. It is designed for convenience in installation, high strength, compact size, easy manufacture with a low production cost, high efficiency and does not require the use of special tools for installation. The coupling utilizes a grab ring module that has a grab ring made with embedded stainless steel, thereby strengthening the fixing force and allowing for quick installation. A flaring surface on a retaining flange has an angle that corresponds to a tapering surface of the grab ring module. When the flaring surface and the tapering surface contact each other, the grab ring module compresses the surface of the pipe. Because the grab ring module has an outer plastic body with a small inner part, the grab ring module can be compressed to the pipe without causing fatigue of any members inside of the fitting. A specialized tool allows for quick and easy dismantling of the fitting.

1 Claim, 7 Drawing Sheets

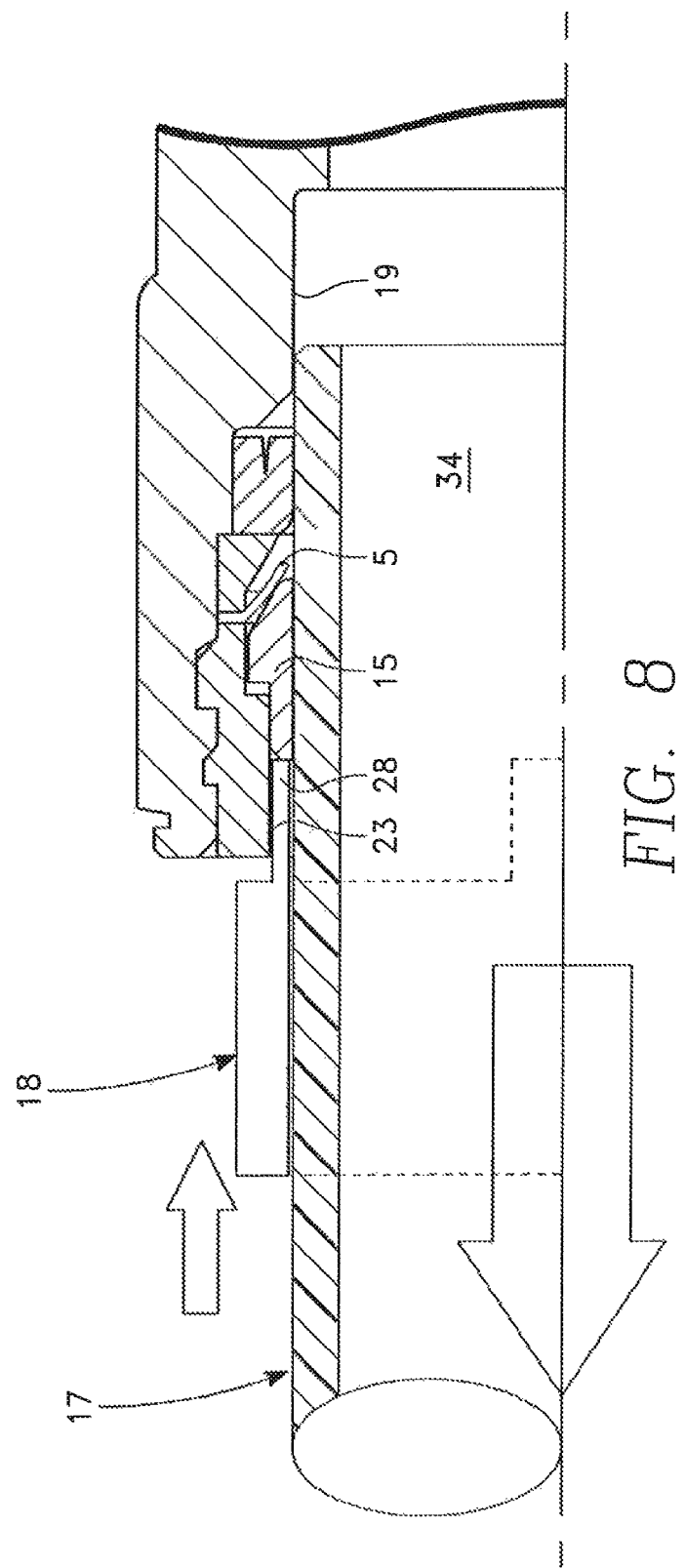

QUICK COUPLING PIPE FITTING SYSTEM

BACKGROUND OF THE INVENTION

1. Field of the Invention

The present invention relates generally to the field of pipe fittings, and more particularly to a fitting for coupling two sections of pipe that are connected together in a fluid tight manner that does not require welding, adhesive, the use of special tools, or other conventional techniques of permanently securing pipes.

2. Background and Description of the Prior Art

Plastic pipe has long been used for conveying fluids such as liquids and gases. Pipe fittings are utilized to connect sections of aligned pipe together. These pipe fittings must provide a fluid tight connection without any leakage over a range of operating temperatures, pressures and a variety of other surrounding conditions. For plastic pipe, however, a reliable fitting is rarely achieved owing to the stress of the fitting caused by the continuous operation of the plastic pipe or the changing of ambient conditions such as temperature and pressure. Such conditions of operation cause the fatigue of the fittings, thereby resulting in performance degradation and leakage.

Many types of pipe fittings are currently commercially available. One type is a compression fitting system. This type of fitting is rather large when compared to the pipe, and requires tools for installation. Due to the bulky size of this type of fitting, its use requires an extensive working space to provide for the installation of such fittings. When use is required in a limited space, e.g., in concrete walls, this type of fitting is very inconvenient.

Moreover, the pipe fittings of the prior art have the potential to be easily dismantled from the pipeline, which may lead to plundering of fluid within the pipeline. The pipe fitting of the present invention, however, requires some special tools to remove the pipe from the fitting thereby eliminating the possibility of any damage to the fitting or the pipe due to inadvertent dismantling while in use.

In the manufacture of the plastic pipe fitting of the prior art as discussed herein, the pipe is first inserted into the fittings and then pulled back so that the teeth of the fitting bite deeply into the wall of the pipe thereby securing the pipe to the fitting in a fluid tight manner. In general, the teeth are constructed from engineering plastics that have limited strength and that are incapable of gripping a pipe that has rather hard surface such as PVC pipe or metallic pipe. Moreover, the firmness of the grip on the pipe decreases with the rise in the temperature of the fluids conveyed through the pipe. If the teeth are totally metallic, they have to be constructed to have a very thick formation due to the portions that form corners. This causes inconvenience in the radial compression because a lot of force is required in order to compress the grip ring to confine it to the surface of the pipe. Such an operation can cause fatigue and deformation of the plastic member exerting the compressive force.

The invention described herein is an improvement over U.S. Pat. No. 7,644,955 to the within inventors.

It was found with the prior patent that the split line defined sometimes caused the grab ring's teeth to lose their bite strength on the pipe. Accordingly the design of the system has been modified to overcome this shortcoming.

It is the primary objective of the instant invention to overcome toe shortcomings of the system defined in U.S. Pat. No. 7,644,955.

It is yet another object of the present invention therefore to provide a plastic pipe fitting that can be used for joining two sections of pipe that are aligned in the same straight line or in the vertical direction in a fluid tight manner over a range of operating pressures and temperatures.

It is yet another objective of the present invention to provide a pipe fitting that can be easily installed without requiring any tools or specially-skilled workers.

It is yet another objective of the present invention to provide a pipe fitting that is compact in size and easy to install in narrow or restricted areas such as embedding in walls or in limited spaces, thus facilitating the installation of the pipe system.

It is yet another objective of the present invention to provide a pipe fitting that can be manufactured on an industrial scale with a production cost lower than most of the prior art, thereby allowing the fittings to be sold to the ultimate consumer at a relatively inexpensive price.

SUMMARY OF THE INVENTION

The instant invention discloses a pipe fitting system comprising: a pipe; a pipe fitting body further comprising an inner wall; a through hole for placement of a pipe therethrough; a pipe stopper located inside of said through hole; seal lip ring with an inward slope area defined as a lip; a grab ring support; a grab ring with a plurality of teeth that form a circle having a radius slightly smaller than the radius of the exterior surface of said pipe that is placed inside of said pipe fitting body; a retaining ring with two or more cavities; a protection cap; and a dismantling device having two or more protruding legs that are received by said two or more cavities in said retaining ring in order to dislodge said pipe from said pipe fitting through the insertion of said dismantling device between said pipe fitting body and said pipe thereby loosening the grip of said grab ring forcing said teeth outward from the surface of said pipe.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 8 is a side interior view as seen in FIG. 7 showing the pipe dismantled and ready for removal.

DETAILED DESCRIPTION OF A PREFERRED EMBODIMENT

Figure 1:
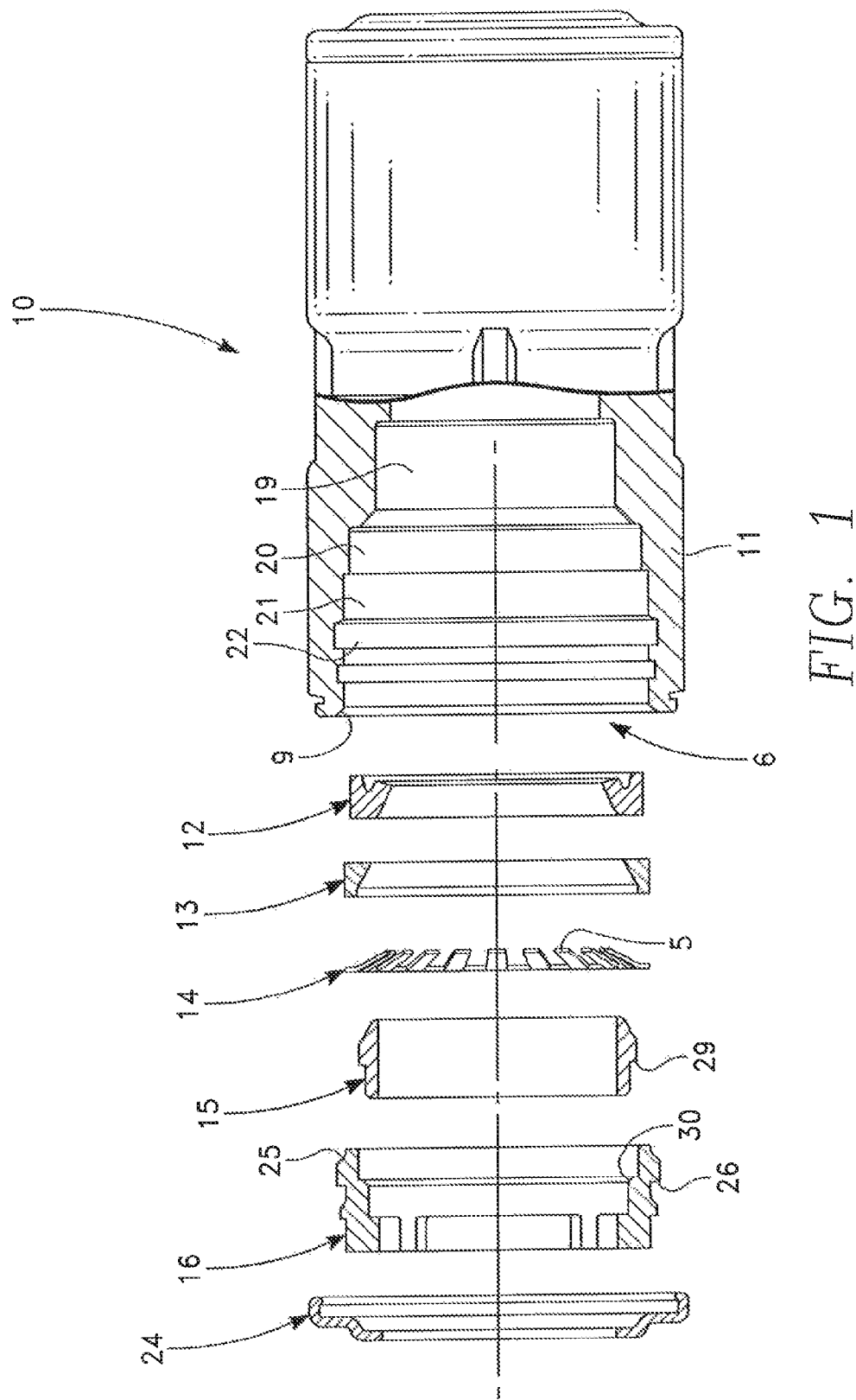
FIG. 1 is an exploded view of the pipe of the instant invention.
Figure 2:
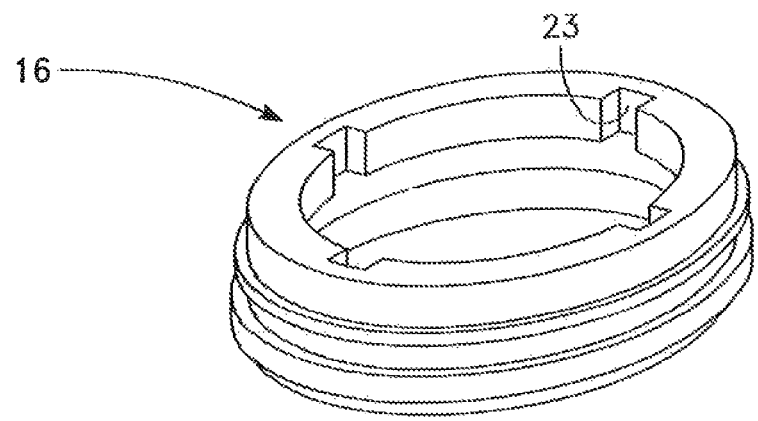
FIG. 2 is a perspective view of the retaining ring that receives the dismantling device.
Figure 3:
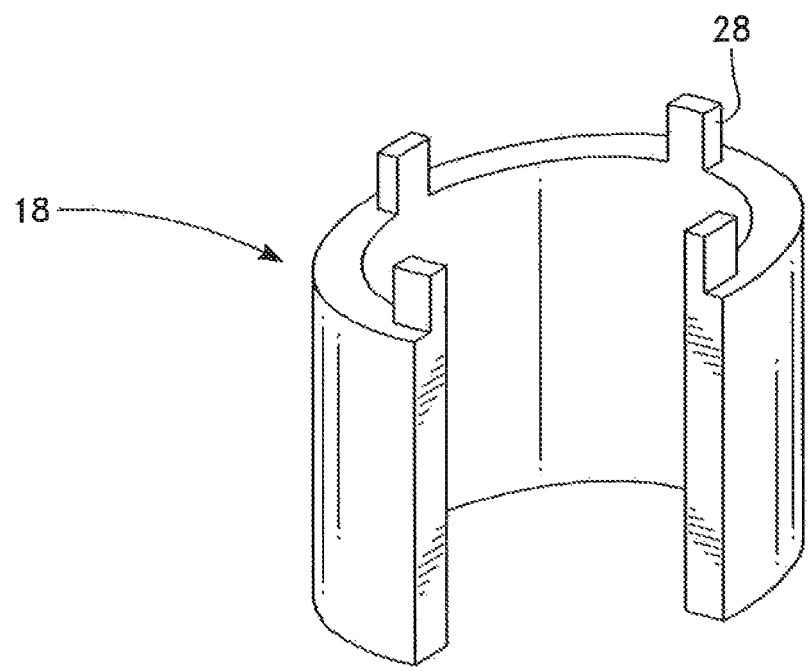
FIG. 3 is a cut away view of the dismantling device.
Figure 4:
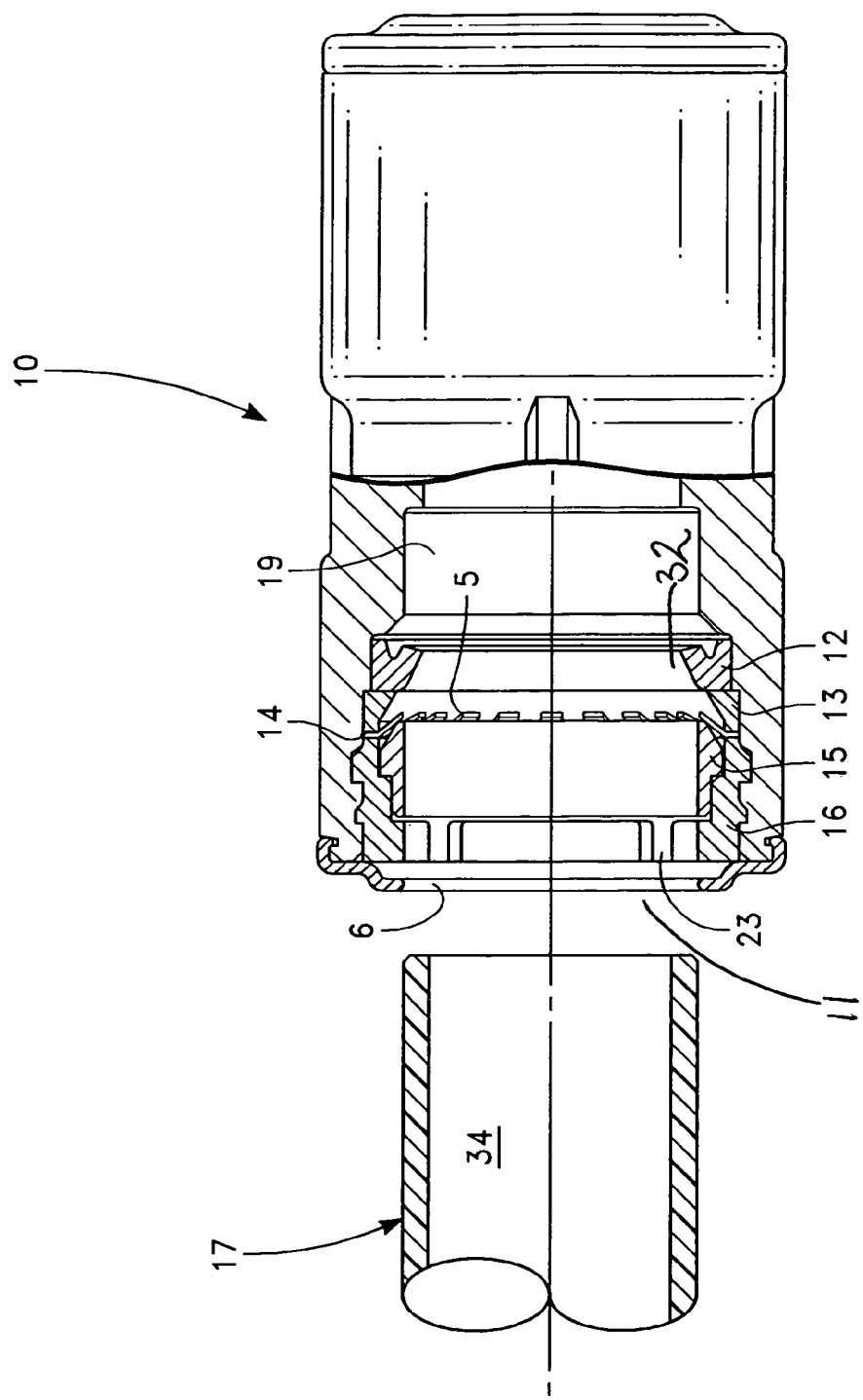
FIG. 4 is a side view of the interior components of the coupling device with all of the pieces intact ready to receive a pipe.
Figure 5:
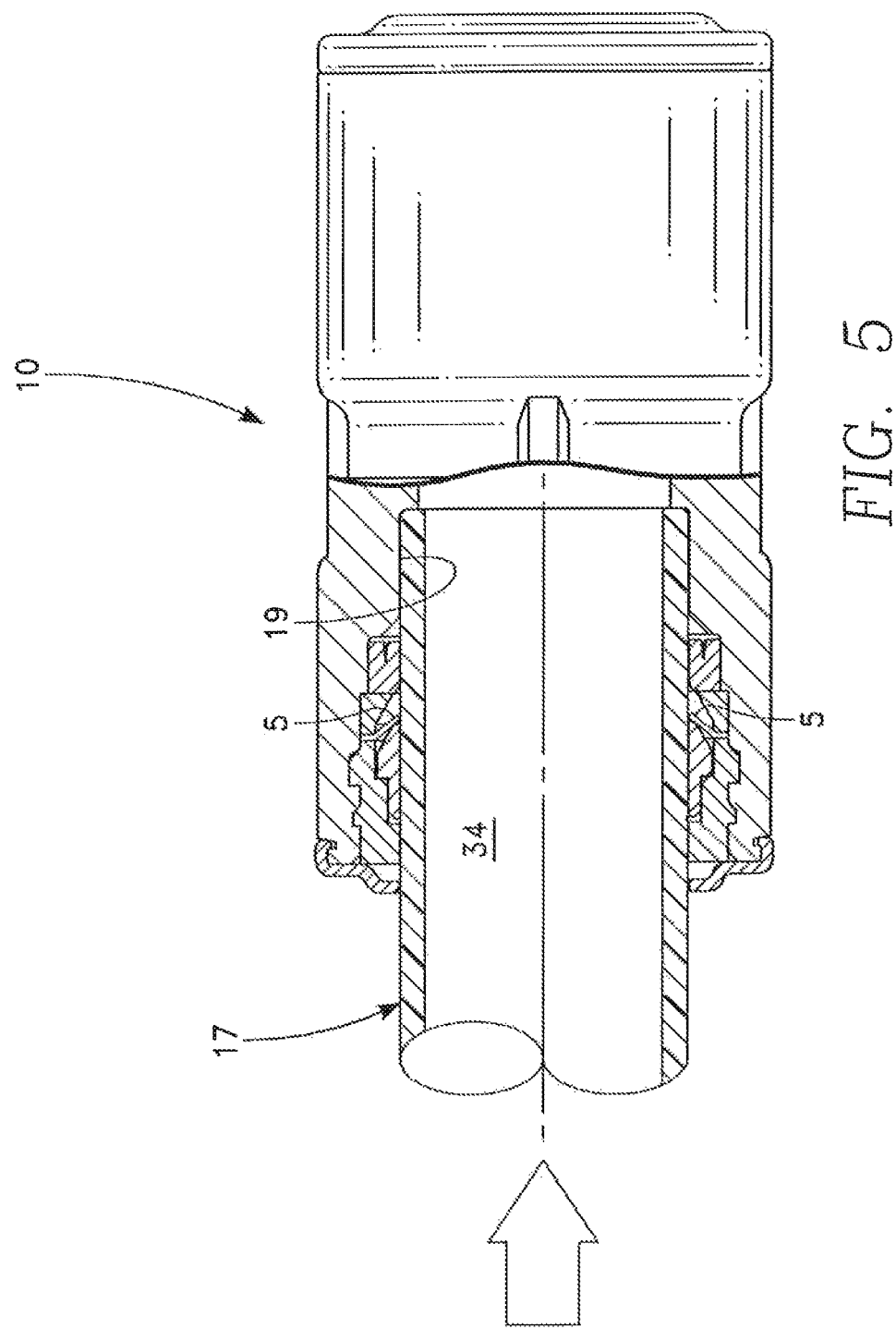
FIG. 5 is a side interior view as seen in FIG. 4 as the pipe is being inserted therein.
Figure 6:
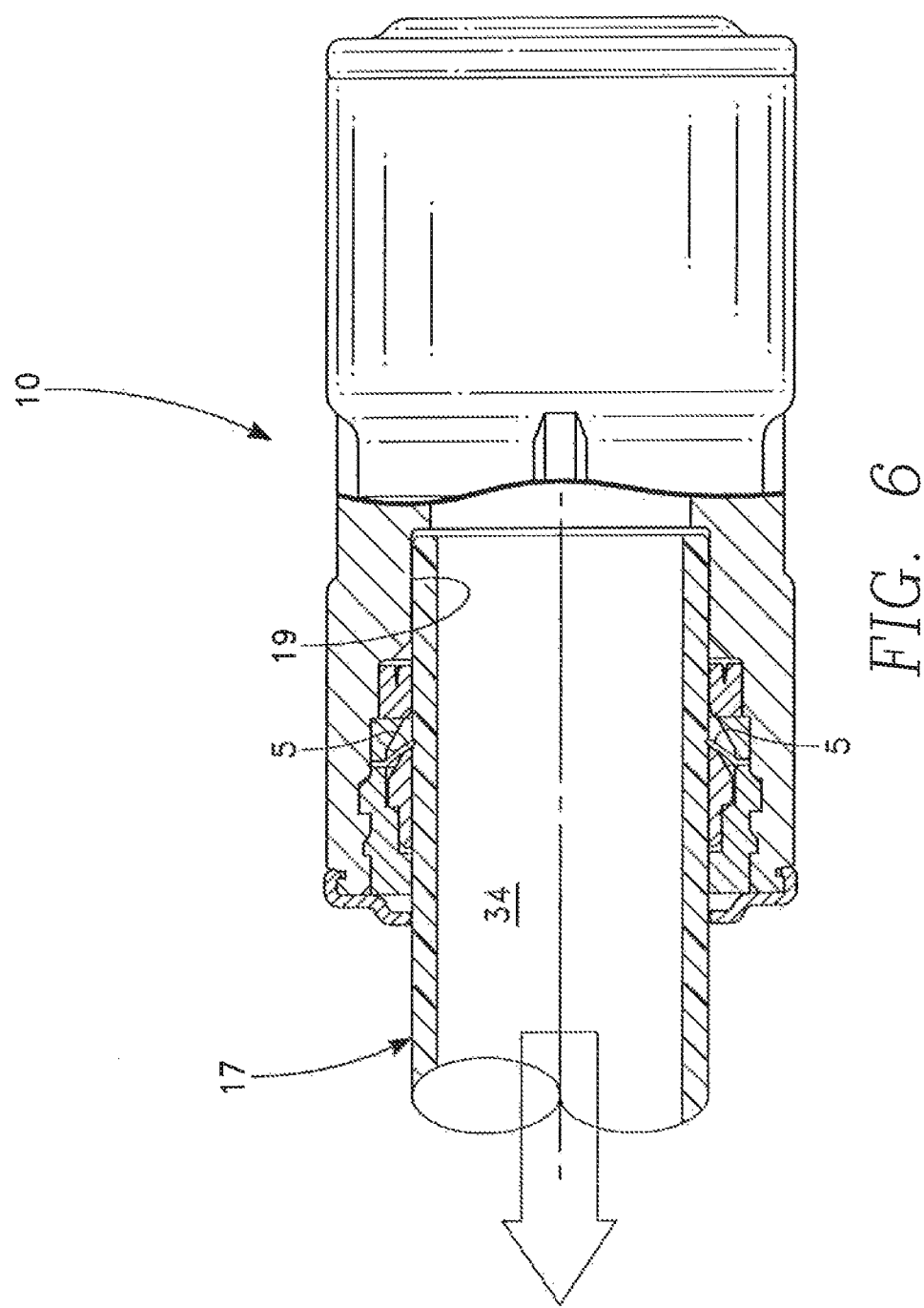
FIG. 6 is a side interior view as seen in FIG. 5 showing the pipe locks in place.
Figure 7:
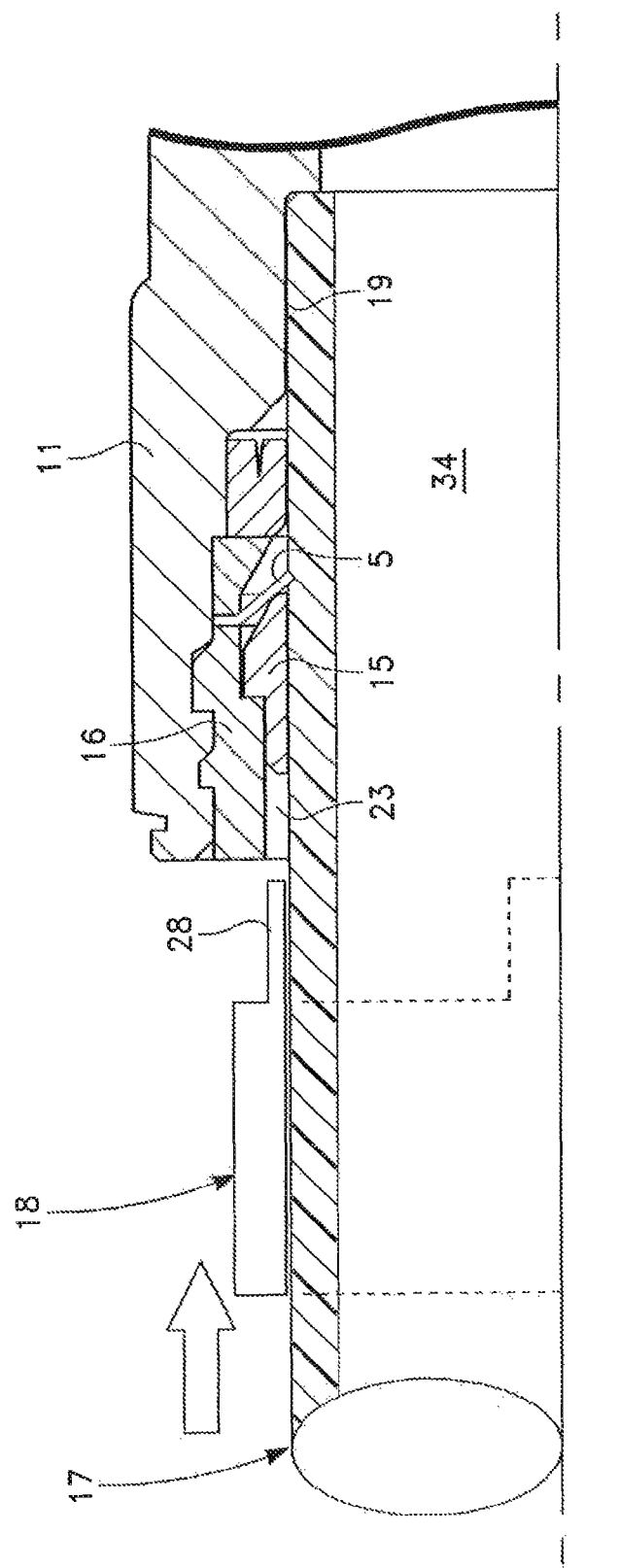
FIG. 7 is a side interior view as seen in FIG. 6, but with the dismantling device being utilized to dislodge a pipe.

Turning to the drawings, the preferred embodiment is illustrated and described by reference characters that denote similar elements throughout the several views of the instant invention.

The preferred embodiment refers to an improved pipe fitting that is shown in exploded view in FIG. 1. The fundamental parts of the pipe fitting are composed of the pipe fitting body 10 with one open end 11, a seal lip ring 12 that replaces the o-ring in the prior patent, a grab ring support 13, a grab ring 14 with teeth 5 that is free from being embedded in the housing and has no split line as was the case in the prior patent, a wedge ring 15, a retaining ring 16 and a protective cap 24.

The pipe fitting body 10 has a through hole 6. In the through hole 6 there is a pipe stopper 19 and an inner wall 9. A pipe 17 is to be placed in the through hole 6 of the body 10 for securing therein.

The grab ring 14 is made from a thin stainless steel ring that has a set of teeth 5 that point to the center of the grab ring 14. The tips of the teeth 5 form a circle. This circle has a radius that is slightly smaller than the radius of the exterior surface of the pipe 17.

There is a chamber 20 for housing the seal lip ring 12. Beneath the seal lip ring chamber 20 is a chamber 21 that houses the grab ring support 13, the grab ring 14 and the wedge ring 15. Below that chamber is another chamber 22 for the retaining ring 16.

At the top of the retaining 16 is a sloping area 25 that allows for easy assembly into the fitting body. Below the portion of the retaining ring 16 that has this sloping area 25 is a small protrusion 26 that locks into position with a small flat area 27 of the inner portion of the fitting body 10 on the outside of the chamber 22 for the retaining ring 16.

There is a small protrusion 29 of the wedge ring 15 that locks into position with a small flat area 30 of the retaining ring 16.

Dismantling the pipe 17 from the pipe fitting body 10 can be done by using a specially designed dismantling device 18. The dismantling device 18 has a series of protruding legs 28 to aid in the dislodging of the pipe 17. These protruding legs 28 fit into corresponding cavities 23 found on the interior diameter of the retaining ring 16.

The working principle of the pipe fitting body 1 is exhibited in FIGS. 4-8.

When the pipe 17 is inserted into the open end 11 of the fitting 10 into the through hole 6, the pipe 17 passes through the retaining ring 16, then the wedge ring 15, which has a cylindrical shape with a protruding funnel-like part at one end 32. The pipe 17 continues to move through the grab ring 14 where the grab ring teeth 5 start to bite the pipe surface 34. The grab ring 14 is securely held in position by the retaining ring 16 and the grab ring support 13.

The protruding funnel-like part 32 of the wedge ring 15 reinforces the strength of the grab ring teeth 5 and maintains the best biting position of the grab ring teeth 5. It also serves another function as a dismantling mechanism.

When the dismantling device 18 is pressed through the cavities 23 of the retaining ring 16, the protruding legs 28 of the device 18 strongly push the wedge ring 15 towards the grab ring 14. The protruding funnel-like part 32 of the wedge ring 15 will then widen the radius of the circular grab ring teeth 5. The grab ring teeth 5 release the pipe 17 for withdrawal from the fitting 10.

After the pipe 17 is inserted through the grab ring 14 and gets bitten, the pipe 17 continues to move through the seal lip ring 12 and then stops at the pipe stopper 19. The seal lip ring 12 provides improved protection from water leakage.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A pipe fitting system comprising:
a pipe having an interior surface and an exterior surface, said pipe being substantially cylindrical;
a pipe connector further comprising
   an inner wall;
   a through hole for placement of a pipe therethrough;
   a pipe stopper located inside of said through hole;
   seal lip ring which has a substantially cylindrical shape with a first end proximate said through hole and a second end that is distal said through hole and that tapers conically at an angle on said distal end;
   a grab ring support;
   a grab ring with a plurality of teeth that form a circle having a radius slightly smaller than the radius of said exterior surface of said pipe that is placed inside of said pipe connector wherein said grab ring has a substantially cylindrical shape with a first end proximate said through hole and a second end that is distal said through hole and that tapers conically at an angle on said distal end;
   a retaining ring with two or more cavities;
   a protection cap; and
   a dismantling device separate from said pipe connector having two or more protruding legs that are received by said two or more cavities in said retaining ring in order to dislodge said pipe from said pipe connector through the insertion of said dismantling device between said pipe connector and said pipe thereby loosening the grip of said grab ring forcing said teeth outward from the surface of said pipe.

* * * * *